(12) United States Patent
Newman et al.

(10) Patent No.: US 11,248,479 B2
(45) Date of Patent: Feb. 15, 2022

(54) CAST TURBINE NOZZLE HAVING HEAT TRANSFER PROTRUSIONS ON INNER SURFACE OF LEADING EDGE

(71) Applicant: General Electric Company, Schenectady, NY (US)

(72) Inventors: Stephen Walter Newman, Greenville, SC (US); Bryan David Lewis, Simpsonville, SC (US); Debdulal Das, Gurugram (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/985,369

(22) Filed: Aug. 5, 2020

(65) Prior Publication Data

US 2021/0388729 A1 Dec. 16, 2021

(30) Foreign Application Priority Data

Jun. 11, 2020 (IN) .............................. 202011024646

(51) Int. Cl.
*F01D 9/04* (2006.01)
*F01D 5/18* (2006.01)

(52) U.S. Cl.
CPC .............. *F01D 9/041* (2013.01); *F01D 5/18* (2013.01); *F01D 5/187* (2013.01); *F01D 5/188* (2013.01); *F01D 5/189* (2013.01); *F05D 2220/3213* (2013.01); *F05D 2240/128* (2013.01);

(Continued)

(58) Field of Classification Search
CPC . F01D 9/041; F01D 5/18; F01D 5/187; F01D 5/188; F01D 5/189; F05D 2260/201; F05D 2250/232; F05D 2220/3213; F05D 2260/22141; F05D 2240/128
See application file for complete search history.

(56) References Cited

U.S. PATENT DOCUMENTS 3,628,880 A 12/1971 Smuland et al.
3,810,711 A * 5/1974 Emmerson .............. F01D 5/184
416/97 R (Continued)

FOREIGN PATENT DOCUMENTS

EP 1469164 A2 10/2004
WO 2015009392 A2 1/2015

*Primary Examiner* — Michael Lebentritt
*Assistant Examiner* — Brian Christopher Delrue
(74) *Attorney, Agent, or Firm* — Charlotte Wilson; Hoffman Warnick LLC (57) ABSTRACT

A cast turbine nozzle includes an airfoil having a body including a suction side, a pressure side opposing the suction side, a leading edge spanning between the pressure side and the suction side, a trailing edge opposing the leading edge and spanning between the pressure side and the suction side, and a cooling cavity defined by an inner surface of the body. The nozzle also includes at least one endwall connected with the airfoil along the suction side, the pressure side, the trailing edge and the leading edge, and a plurality of heat transfer protrusions extending inwardly from the inner surface within the body, the plurality of heat transfer protrusions extending from the leading edge along the suction side and along the pressure side in a radially staggered columnar pattern. The inner surface includes a planar surface extending between adjacent heat transfer protrusions.

20 Claims, 8 Drawing Sheets

(52) U.S. Cl.
CPC .. *F05D 2250/232* (2013.01); *F05D 2260/201* (2013.01); *F05D 2260/22141* (2013.01)

(56) References Cited

U.S. PATENT DOCUMENTS

| | | | |
|---|---|---|---|
| 4,359,310 A * | 11/1982 | Endres | F02K 1/822 |
| | | | 415/115 |
| 5,353,865 A | 10/1994 | Adiutori et al. | |
| 5,361,828 A | 11/1994 | Lee et al. | |
| RE40,658 E | 3/2009 | Powis et al. | |
| 8,348,613 B2 | 1/2013 | Gregg et al. | |
| 9,133,717 B2 | 9/2015 | Nakamata et al. | |
| 9,523,283 B2 * | 12/2016 | Uechi | F01D 5/189 |
| 9,915,151 B2 * | 3/2018 | Weaver | F01D 9/02 |
| 10,012,091 B2 * | 7/2018 | Morgan | F01D 5/187 |
| 10,767,487 B2 * | 9/2020 | Propheter-Hinckley | |
| | | | F01D 5/282 |
| 10,815,806 B2 * | 10/2020 | Correia | F01D 5/189 |
| 2006/0222497 A1 * | 10/2006 | Lee | F01D 5/186 |
| | | | 416/97 R |
| 2012/0076645 A1 * | 3/2012 | Tibbott | F01D 5/187 |
| | | | 415/180 |
| 2017/0003027 A1 | 1/2017 | Kostka et al. | |
| 2017/0037731 A1 * | 2/2017 | Morgan | F01D 5/187 |
| 2017/0226879 A1 | 8/2017 | Ristau et al. | |
| 2017/0248031 A1 | 8/2017 | Ugarte | |
| 2018/0045055 A1 | 2/2018 | Brzek et al. | |
| 2019/0170001 A1 * | 6/2019 | Frach | F01D 5/187 |
| 2021/0123352 A1 * | 4/2021 | Townes | F01D 9/041 |

\* cited by examiner

CAST TURBINE NOZZLE HAVING HEAT TRANSFER PROTRUSIONS ON INNER SURFACE OF LEADING EDGE

TECHNICAL FIELD

The disclosure relates generally to turbomachines and, more particularly, to a cast turbine nozzle having heat transfer protrusions on an inner surface of a leading edge of a cooling cavity in the airfoil.

BACKGROUND

Turbine nozzles include cooling cavities in airfoil bodies to direct a coolant to cool the airfoil. The cooling cavity provides space for an impingement cooling sleeve that directs coolant against an inner surface of the airfoil body that defines the cooling cavity. In certain nozzle stages, it is advantageous to make leading edges of the turbine nozzles smaller in radius, which narrows the airfoil. The narrower airfoils make it more difficult to maintain cooling with conventional impingement cooling.

BRIEF DESCRIPTION

A first aspect of the disclosure provides a cast turbine nozzle including: an airfoil having a body including a suction side, a pressure side opposing the suction side, a leading edge spanning between the pressure side and the suction side, a trailing edge opposing the leading edge and spanning between the pressure side and the suction side, and a cooling cavity defined by an inner surface of the body; at least one endwall connected with the airfoil along the suction side, the pressure side, the trailing edge and the leading edge; and a plurality of heat transfer protrusions extending inwardly from the inner surface of the body within the cooling cavity, the plurality of heat transfer protrusions extending from the leading edge along the suction side and along the pressure side in a radially staggered columnar pattern, wherein the inner surface includes a planar surface extending between adjacent heat transfer protrusions.

A second aspect of the disclosure provides a nozzle section for a turbine, the nozzle section having a set of nozzles, the set of nozzles including at least one cast nozzle having: an airfoil having a body including a suction side, a pressure side opposing the suction side, a leading edge spanning between the pressure side and the suction side, a trailing edge opposing the leading edge and spanning between the pressure side and the suction side, and a cooling cavity defined by an inner surface of the body; at least one endwall connected with the airfoil along the suction side, the pressure side, the trailing edge and the leading edge; and a plurality of heat transfer protrusions extending inwardly from the inner surface of the body within the cooling cavity, the plurality of heat transfer protrusions extending from the leading edge along the suction side and along the pressure side in a radially staggered columnar pattern, wherein the inner surface includes a planar surface extending between adjacent heat transfer protrusions.

A third aspect of the disclosure provides a turbine including a plurality of cast turbine nozzles, each of the cast turbine nozzles comprising: an airfoil having a body including a suction side, a pressure side opposing the suction side, a leading edge spanning between the pressure side and the suction side, a trailing edge opposing the leading edge and spanning between the pressure side and the suction side, and a cooling cavity defined by an inner surface of the body; at least one endwall connected with the airfoil along the suction side, the pressure side, the trailing edge and the leading edge; and a plurality of heat transfer protrusions extending inwardly from the inner surface of the body within the cooling cavity, the plurality of heat transfer protrusions extending from the leading edge along the suction side and along the pressure side in a radially staggered columnar pattern, wherein the inner surface includes a planar surface extending between adjacent heat transfer protrusions.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure it will become necessary to select certain terminology when referring to and describing relevant machine components within a turbomachine. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as coolant in a post-impingement space in an airfoil or, for example, the flow of air through the combustor. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward section of the turbomachine.

It is often required to describe parts that are disposed at differing radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently described element or feature may or may not be present and that the description includes instances where the event occurs (or the feature is present) and instances where it does not (or is not present).

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Embodiments of the disclosure provide a cast turbine nozzle, a turbine nozzle section, and a turbine. The turbine nozzle includes a plurality of heat transfer protrusions on an inner surface of a cooling cavity in the airfoil thereof. The heat transfer protrusions provide improved cooling effectiveness to maintain part life, turbine efficiency, and power output. More particularly, the heat transfer protrusions (or "bumps") increase surface area internal to the airfoil and provide additional heat transfer effectiveness by disturbing airflow and "tripping" boundary layer flow, increasing the exchange of energy (heat transfer), relative to a flat, non-enhanced surface. Heat transfer protrusions are applied only to a portion of airfoil body, namely the area including and surrounding the leading edge to prevent overheating downstream from the leading edge for narrower airfoils.

Figure 1:
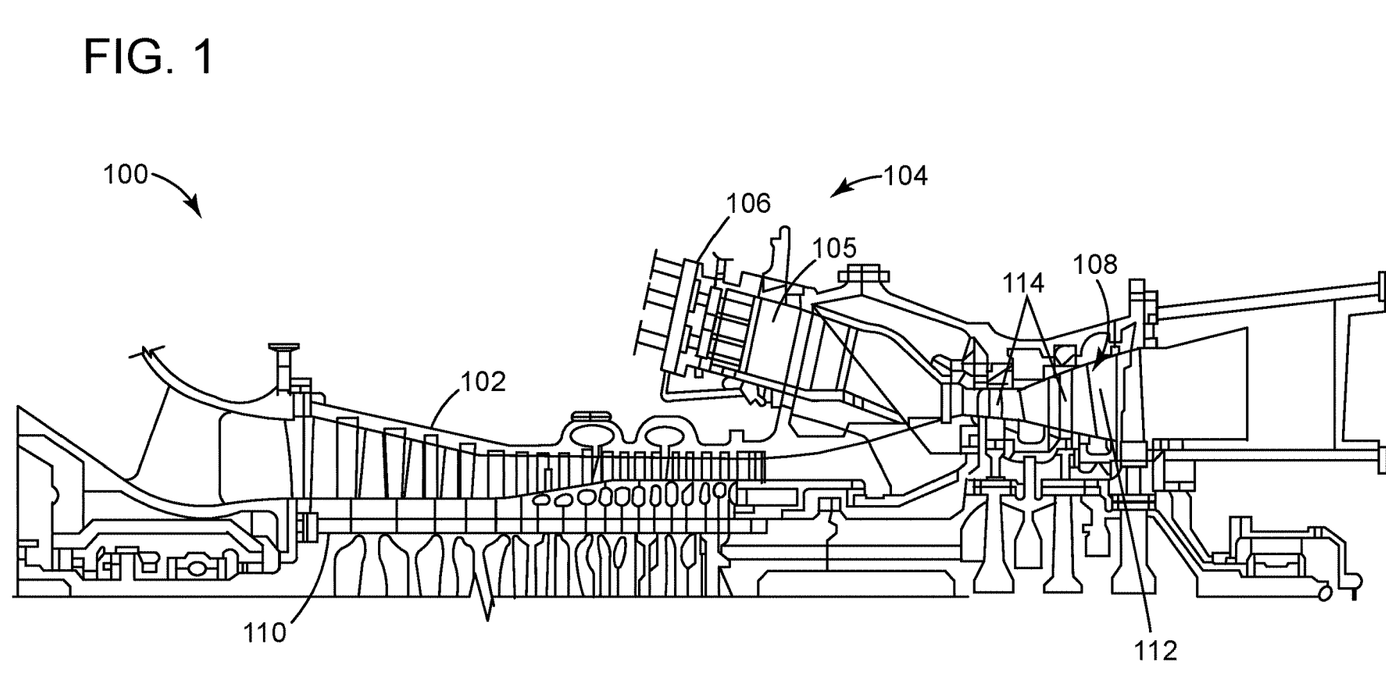
FIG. 1 is a schematic view of an illustrative turbomachine in the form of a combustion turbine or gas turbine (GT) system, according to embodiments of the disclosure.

Referring to the drawings, FIG. 1 is a schematic view of an illustrative turbomachine 90 in the form of a combustion turbine or gas turbine (GT) system 100 (hereinafter, "GT system 100"). GT system 100 includes a compressor 102 and a combustor 104. Combustor 104 includes a combustion region 105 and a head end assembly 106 that includes one or more fuel nozzles. GT system 100 also includes a turbine 108 and a common compressor/turbine shaft 110 (hereinafter referred to as "rotor 110"). In one embodiment, GT system 100 is a 6F.03 FL18 engine, commercially available from General Electric Company, Greenville, S.C. The present disclosure is not limited to any one particular GT system and may be implanted in connection with other engines including, for example, the other HA, F, B, LM, GT, TM and E-class engine models of General Electric Company and engine models of other companies. Further, the teachings of the disclosure are not necessarily applicable to only a GT system and may be applied to blades and/or nozzles of other types of turbomachines, e.g., steam turbines, jet engines, compressors, etc.

In operation, air flows through compressor 102, and compressed air is supplied to combustor 104. Specifically, the compressed air is supplied to fuel nozzles in head end assembly 106 that is integral to combustor 104. Head end assembly 106 is in flow communication with combustion region 105. Fuel nozzles in head end assembly 106 are also in flow communication with a fuel source (not shown in FIG. 1), and the fuel nozzles channel fuel and air to combustion region 105. Combustor 104 ignites and combusts fuel to generate combustion products. In the illustrative embodiment, there are a plurality of combustors 104 having head end assemblies 106 with one or more fuel nozzles per head end assembly 106. Combustors 104 are in flow communication with turbine 108 within which gas stream thermal energy from the combustion products is converted to mechanical rotational energy.

Turbine 108 is rotatably coupled to and drives rotor 110. Compressor 102 also is rotatably coupled to rotor 110. At least one end of rotor 110 may extend axially away from turbine 108 and may be attached to a load or machinery (not shown), such as, but not limited to, a generator, a load compressor, and/or another turbine.

Figure 2:
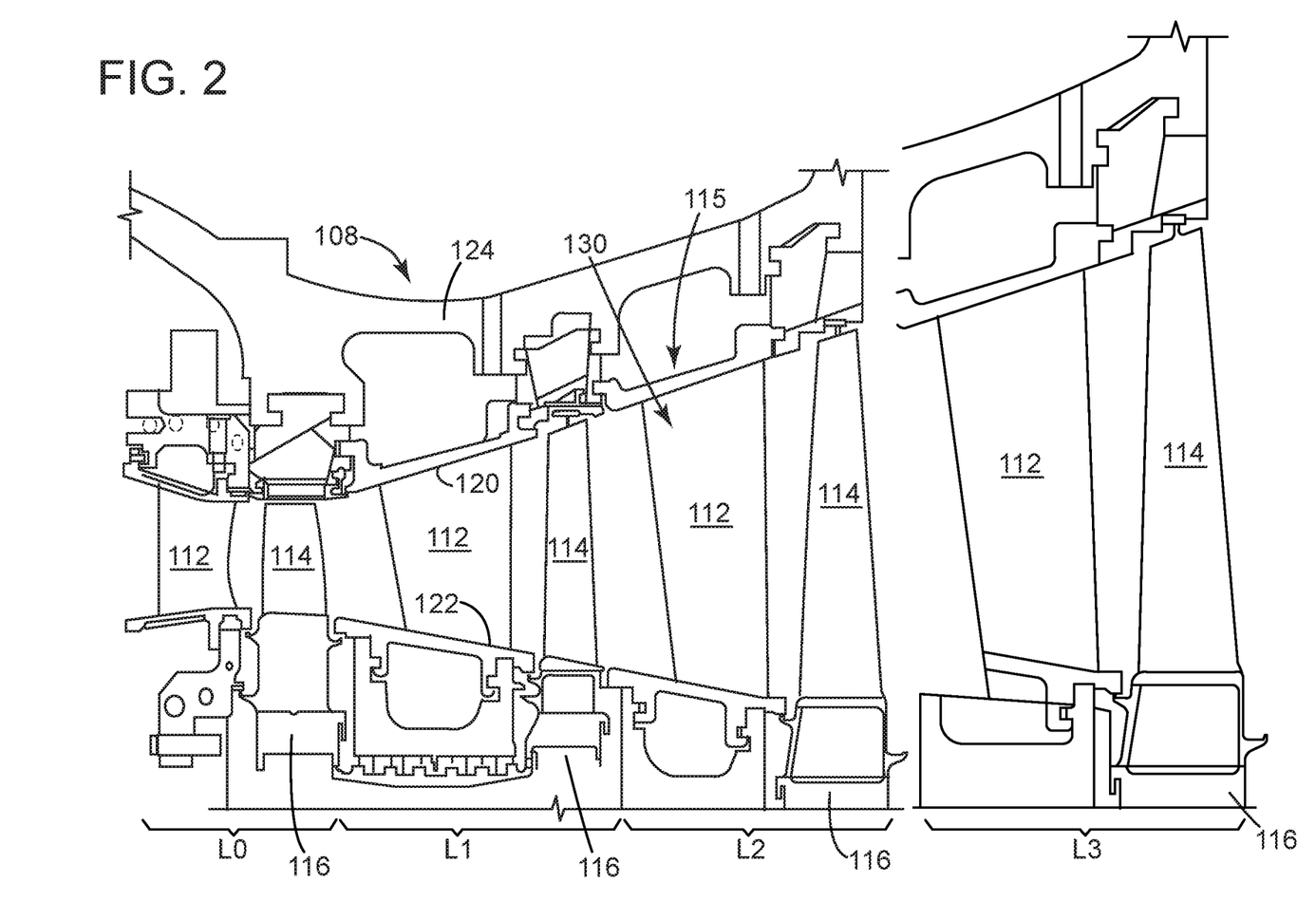
FIG. 2 is a cross-section illustration of an example gas turbine assembly with a four-stage turbine that may be used with the turbomachine in FIG. 1.

FIG. 2 shows a cross-section view of an illustrative portion of turbine 108 with four stages L0-L3 that may be used with GT system 100 in FIG. 1. The four stages are referred to as L0, L1, L2, and L3. Stage L0 is the first stage and is the smallest (in a radial direction) of the four stages. Stage L1 is the second stage after the first stage in an axial direction. Stage L2 is the third stage and is the next stage after the second stage in an axial direction. Stage L3 is the fourth, last stage in the axial direction, and its blades are the largest (in a radial direction). It is to be understood that four stages are shown as one example only, and each turbine may have more or less than four stages.

A set of stationary vanes or nozzles 112 cooperate with a set of rotating blades 114 to form each stage L0-L3 of turbine 108 and to define a portion of a flow path through turbine 108. Rotating blades 114 in each set are coupled to a respective rotor wheel 116 that couples them circumferentially to rotor 110 (FIG. 1). That is, a plurality of rotating blades 114 are mechanically coupled in a circumferentially spaced manner to each rotor wheel 116. A static nozzle section 115 includes a plurality of stationary nozzles 112 circumferentially spaced around rotor 110. Each nozzle 112 may include at least one endwall (or platform) 120, 122 connected with airfoil 130. In the example shown, nozzle 112 includes a radially outer endwall 120 and a radially inner endwall 122. Radially outer endwall 120 couples nozzle(s) 112 to a casing 124 of turbine 108. In certain embodiments, static nozzle section 115 is a second stage nozzle section, i.e., stage L1 in FIG. 2.

Figure 3:
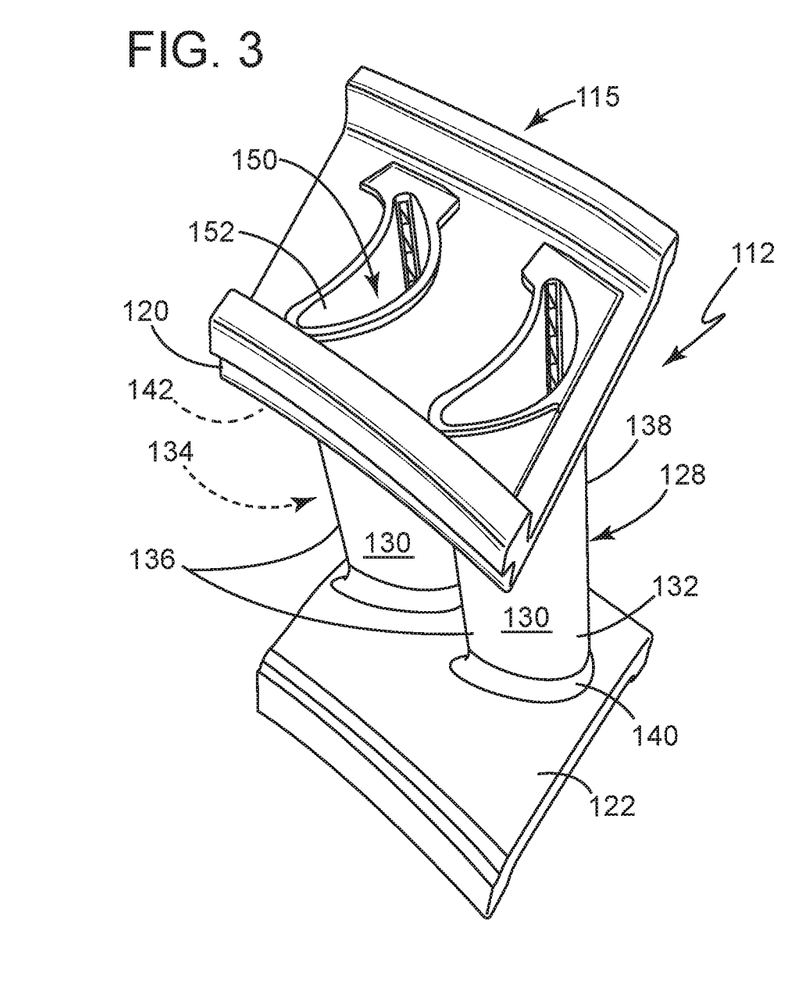
FIG. 3 shows a schematic perspective view of an illustrative pair of turbine nozzles including an airfoil with heat transfer projections, according to various embodiments of the disclosure.

Turning to FIG. 3, a schematic perspective view of a cast turbine nozzle (or simply, nozzle) 112 is shown, according to various embodiments to better illustrate the parts of a nozzle. In FIG. 3, two nozzles 112 are shown as part of a static nozzle section 115. In this manner, each nozzle 112 is a stationary nozzle, which forms part of static nozzle section 115 (FIG. 2) and which forms part of an annulus of stationary nozzles in a stage of a turbine (e.g., turbine 108), as previously described. During operation of a turbine (e.g., turbine 108), nozzle 112 will remain stationary in order to direct the flow of working fluid (e.g., gas, but could be steam) to one or more movable blades (e.g., blades 114), causing those movable blades to initiate rotation of a rotor 110. It is understood that nozzle 112 may be configured to couple (mechanically couple via fasteners, welds, slot/grooves, etc.) with a plurality of similar or distinct nozzles (e.g., nozzles 112 or other nozzles) to form an annulus of nozzles in a stage L0-L3 of turbine 108.

Each turbine nozzle 112 can include a body 128 having an airfoil 130 having a convex suction side 132, and a concave pressure side 134 (obstructed in FIG. 3) opposing suction side 132. Nozzle 112 can also include a leading edge 136 spanning between pressure side 134 and suction side 132 and a trailing edge 138 opposing leading edge 136 and spanning between pressure side 134 and suction side 132. As shown, and as previously noted, nozzle 112 can also include at least one endwall 120, 122 (two shown) connected with airfoil(s) 130 along suction side 132, pressure side 134, trailing edge 138 and leading edge 136. In the example shown, each nozzle 112 includes a radially outer endwall 120 and a radially inner endwall 122. Radially outer endwalls 120 are configured to align on the radially outer side of static nozzle section 115 (FIG. 2) and to couple respective nozzle(s) 112 to casing 124 (FIG. 2) of turbine 108 (FIG. 2). Radially inner endwalls 122 are configured to align on the radially inner side of static nozzle section 115 (FIG. 2).

In various embodiments, each nozzle 112 includes a fillet 140, 142 connecting airfoil 130 and each respective endwall 120, 122. Fillet 140 can include a weld or braze fillet, which may be formed via conventional metal-inert gas (MIG) welding, tungsten-inert gas (TIG) welding, brazing, etc. Fillets 140, 142 can overlap a portion of airfoil 130. The extent of overlap can vary from nozzle to nozzle, stage to stage, and/or turbine to turbine.

Each nozzle 112 according to embodiments of the disclosure are cast, e.g., formed by molten material poured into a cast and hardened. Nozzle(s) 112 may include any now known or later developed metal or metal alloy, such as a superalloy, capable of withstanding the environment within turbine 108.

Figure 4:
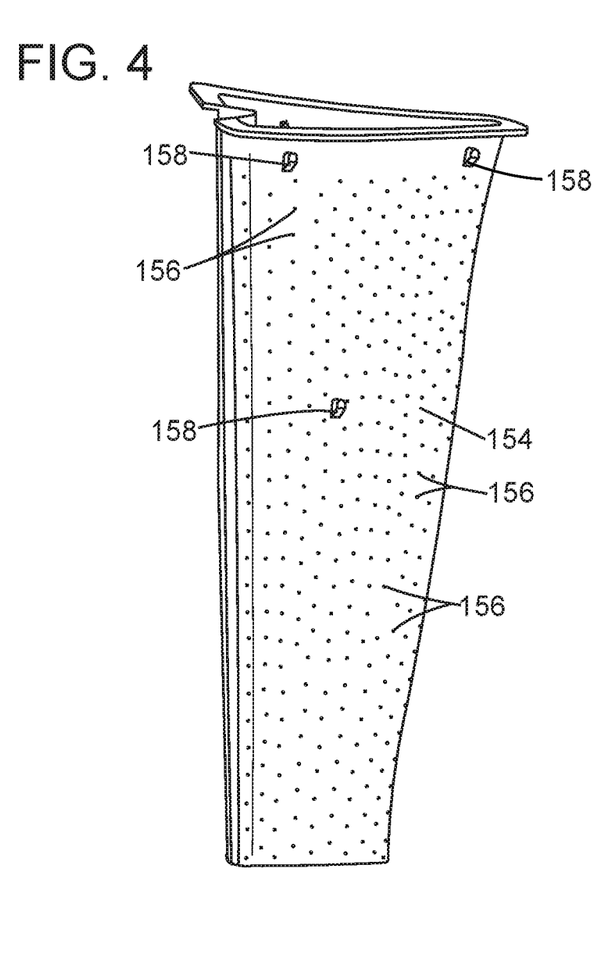
FIG. 4 shows a perspective view of an illustrative impingement sleeve for use with the turbine nozzle, according to embodiments of the disclosure.

Each nozzle 112 may also include a cooling cavity 150 having an inner surface 152 defined within body 128. FIG. 4 shows a perspective view of an illustrative impingement insert or sleeve 154 that is inserted in each cooling cavity 150. That is, in operation, impingement sleeve 154 is positioned within cooling cavity 150. As illustrated, impingement sleeve 154 includes a plurality of holes 156 therein configured to direct a coolant against inner surface 152 and about plurality of heat transfer protrusions 160 (shown in FIGS. 5-7). As understood in the art, cooling cavity 150 is fluidly coupled to a source of coolant, such as pressurized air from compressor 102. The coolant passes through holes 156 in impingement insert 154 to impact against inner surface 152 to cool nozzle 112. Positioners 158 may space impingement sleeve 154 from inner surface 152 to create an impingement cooling area therebetween.

In certain commercial embodiments of turbine 108, it has been found advantageous to scale nozzle 112 for use on turbines 108 of a different (e.g., smaller) gas turbine 100. Accordingly, the size of nozzle 112 (and particularly, airfoil 130) is made smaller and/or narrower, which results in a radius of leading edge 136 becoming increasingly smaller. The narrower airfoil 130 makes it more difficult to cool leading edge 136 with conventional impingement cooling. For example, turbine nozzle 112 may include a second stage nozzle for a 6-series gas turbine.

Figure 5:
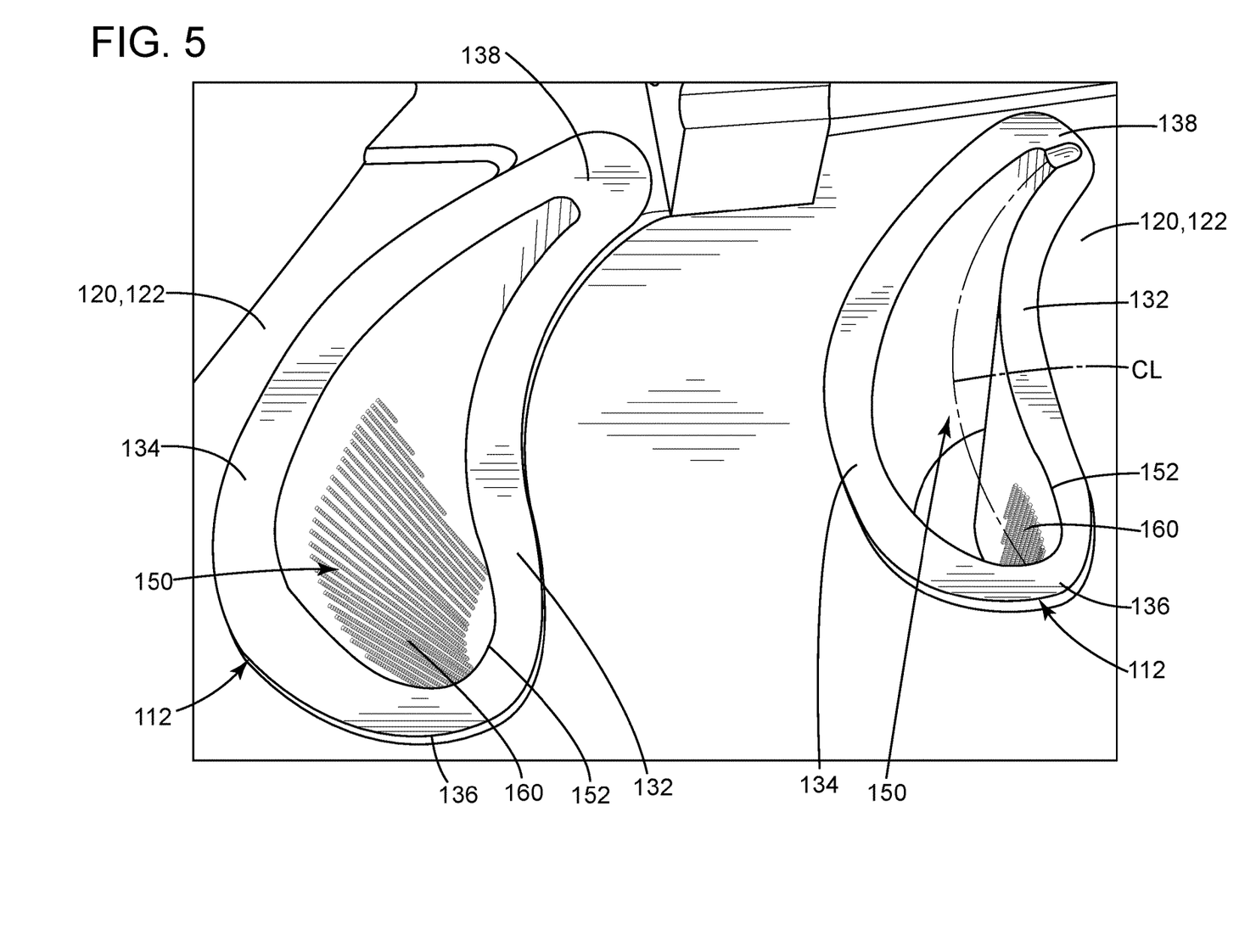
FIG. 5 shows an overhead perspective view of a pair of cast turbine nozzles in a turbine nozzle section, according to embodiments of the disclosure.
Figure 6:
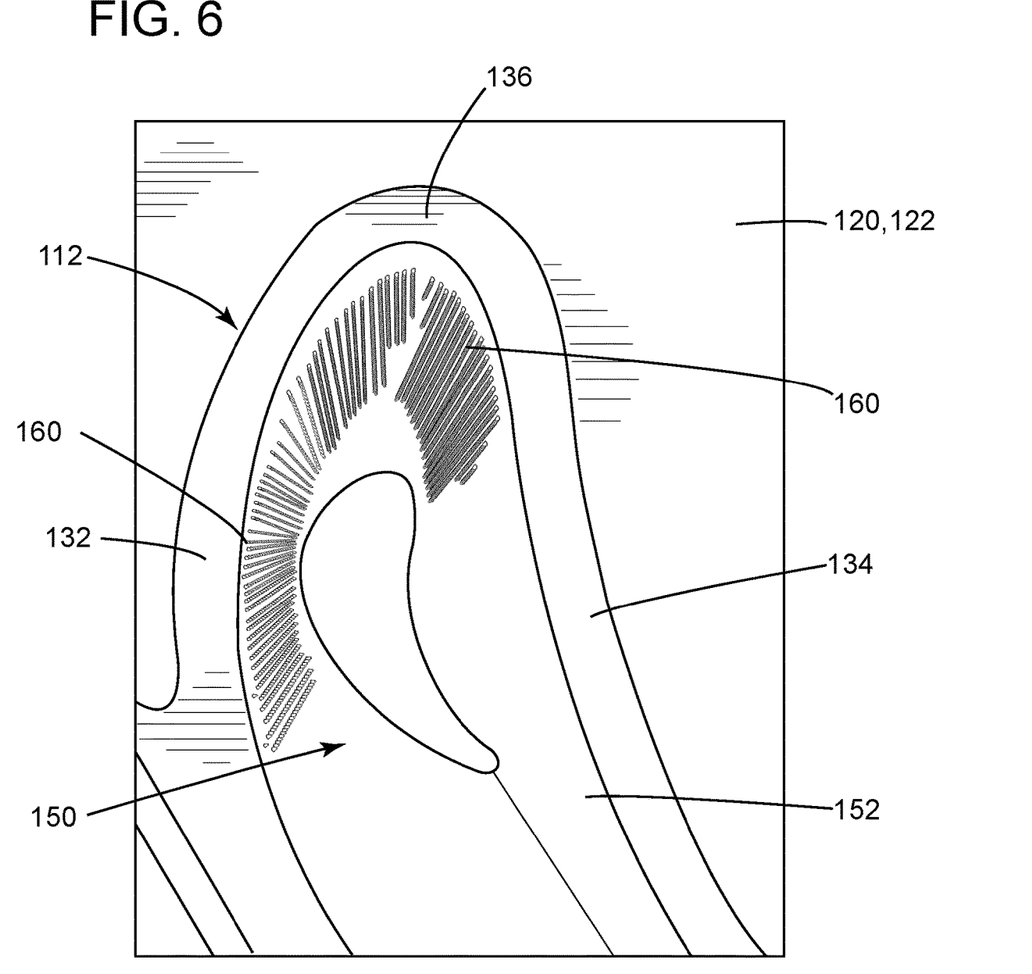
FIG. 6 shows a slightly enlarged overhead perspective view of a cast turbine nozzle, according to embodiments of the disclosure.
Figure 7:
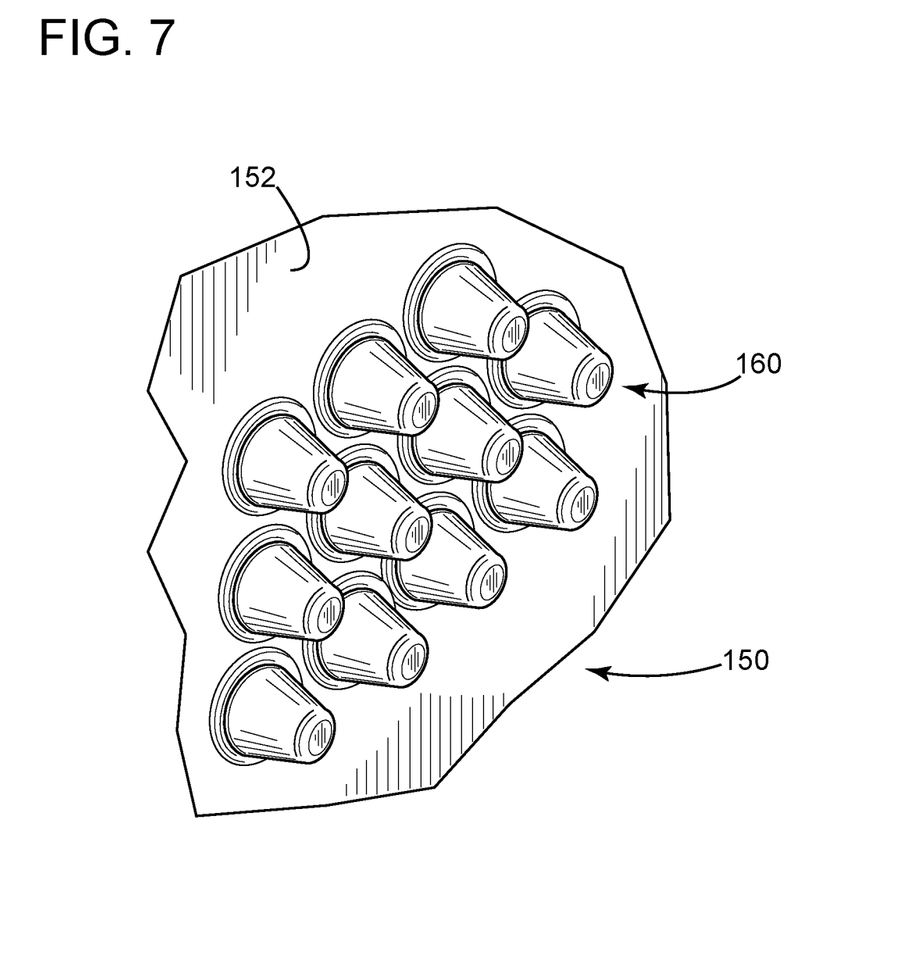
FIG. 7 shows a perspective view of a number of heat transfer projections, according to embodiments of the disclosure.

Embodiments of the disclosure provide a plurality of heat transfer protrusions 160 extending inwardly from inner surface 152 within body 128 in a radially staggered columnar pattern. Protrusions 160 are integral with airfoil 130. FIG. 5 shows a perspective view and FIG. 6 shows a slightly enlarged perspective view of cast turbine nozzle(s) 112 including heat transfer protrusions 160, and FIG. 7 shows an enlarged perspective view of a plurality of heat transfer protrusions 160. Heat transfer protrusions 160 extend from inner surface 152 at leading edge 136 along suction side 132 and along pressure side 134 in a radially staggered columnar pattern. Heat transfer protrusions 160 do not extend along an entire chordal length of each side 132, 134, as is conventional, because it has been discovered doing so with narrower airfoils 130 causes overheating in the downstream areas, closer to trailing edge 138. Rather, plurality of heat transfer protrusions extends in a range of 28% to 32% of a camber length along suction side 132, and a range of 9% to 13% of the camber length along pressure side 134. "Camber length" represents a distance from leading edge 136 to trailing edge 138 through a center of airfoil 130, equidistant between suction side 132 and pressure side 134. A rough approximation of a camber length CL is shown in FIG. 5. The extent of heat transfer protrusions 160 based on the stated percentages of camber length would be defined on each side 132, 134 at a location perpendicular to the camber length. In any event, only portions of inner surface along each side 132, 134 are covered by heat transfer protrusions 160, and inner surface 152 downstream of heat transfer protrusions 160 is devoid of protrusions or other structures that cause turbulence in the coolant flow in the aft direction towards trailing edge 138. Heat transfer protrusions 160 may extend to any radial extent on each side 132, 134 to achieve the desired heat transfer. For example, they may span an entire radial length between endwalls 120, 122. In contrast, in certain embodiments, heat transfer protrusions 160 may extend radially, but stop in a range of 8 to 13 millimeters from one or more endwalls 120, 122.

Figure 8:
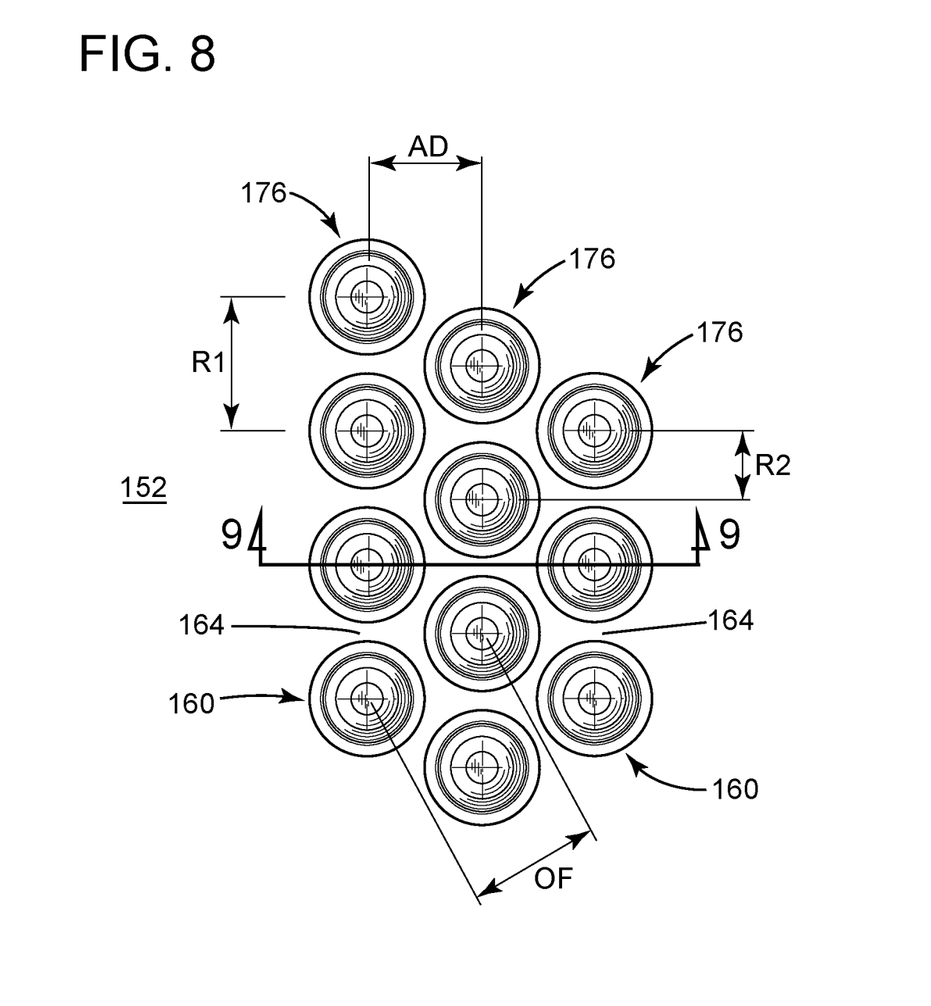
FIG. 8 shows a plan view of an inner surface of a cooling cavity looking at the top of heat transfer projections, according to embodiments of the disclosure.
Figure 9:
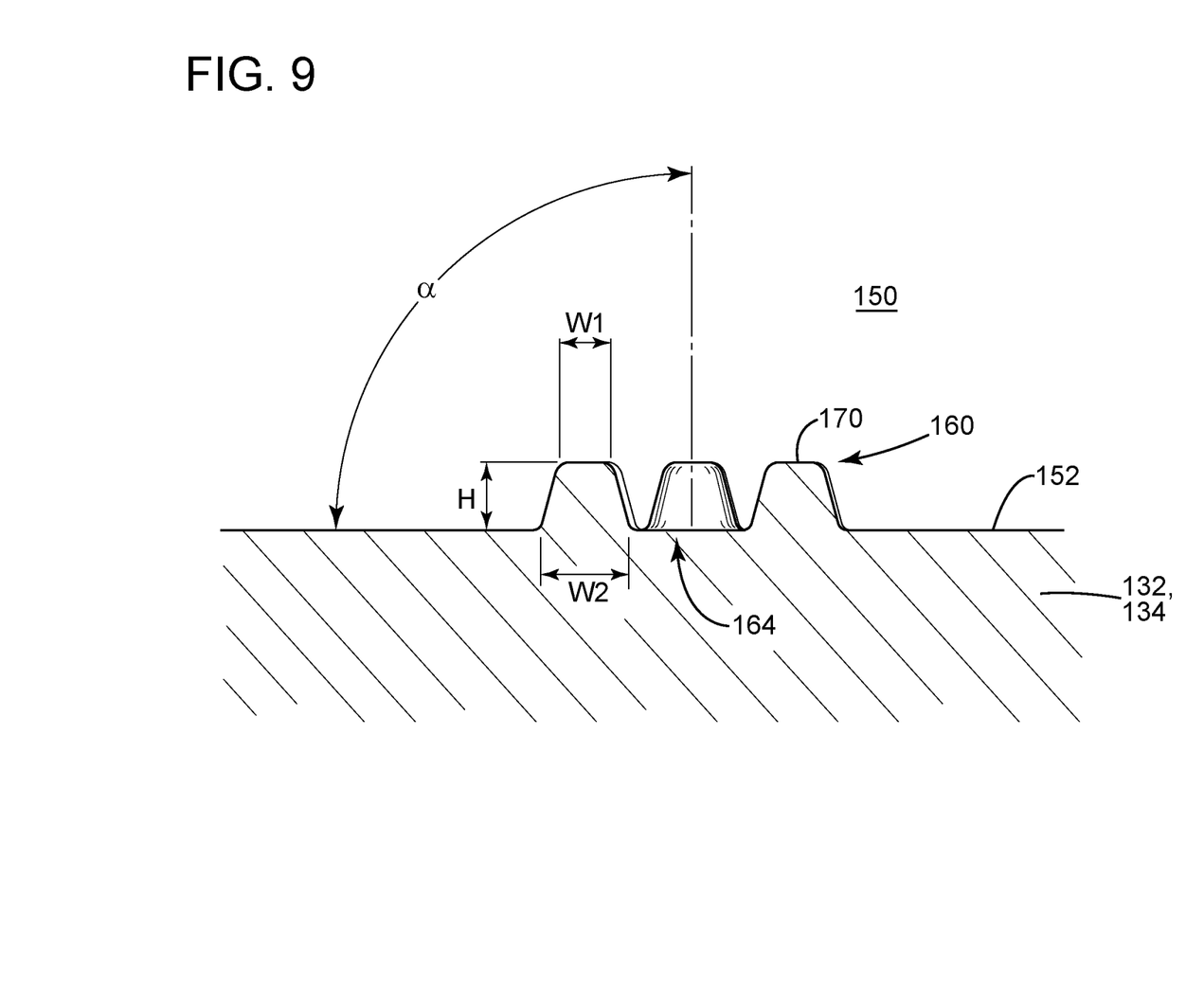
FIG. 9 shows a cross-sectional side view of heat transfer projections along line 9-9 in FIG. 8, according to embodiments of the disclosure.

FIG. 8 shows a plan view of inner surface 152 looking at tops of heat transfer protrusions 160, and FIG. 9 shows a cross-sectional side view of heat transfer protrusions 160 along line 9-9 in FIG. 8. As shown in FIGS. 8 and 9, inner surface 152 includes a planar surface 164 extending between adjacent heat transfer protrusions 160. That is, planar surface 164 separates adjacent heat transfer protrusions 160, with no inward or outward curvature of inner surface 152 other than exists to form airfoil 130. In addition, as shown in FIG. 9, each heat transfer protrusion 160 may have a frustoconical cross-section through a height thereof. Each heat transfer protrusion 160 has an innermost surface 170 that is parallel with inner surface 152 of cooling cavity 150 (FIGS. 5-6) between adjacent heat transfer protrusions 160. As used herein, "innermost" indicates a portion of a structure closest to a center of airfoil 130, and "outermost" indicates a portion of a structure farthest from a center of airfoil 130. A height H of each heat transfer protrusion 160 from inner surface 152 of cooling cavity 150 to innermost surface 170 of heat transfer protrusion 160 may range from 0.5 millimeters to 1.0 millimeters.

Heat transfer projections 160 may have an innermost width W1 that ranges from 0.2 millimeters to 0.8 millimeters. Heat transfer projections 160 may have an outermost width W2 that ranges from 0.6 millimeters to 1.2 millimeters. Outermost width W2 is wider than innermost width W1. A ratio of innermost width W1 of each heat transfer protrusion 160 to outermost width W2 of each heat transfer protrusion 160 relative to inner surface 152 is in a range from 0.2 to 0.9. As shown in FIG. 9, each heat transfer protrusion 160 may have a circular cross-section through a width thereof. However, other non-elongated shapes may be possible. Heat transfer projections 160 extend from inner surface 152 in a substantially perpendicular angle α, i.e., at substantially 90°.

As shown in FIGS. 6 and 8, heat transfer protrusions 160 are arranged in a radially staggered columnar pattern. As shown best in FIG. 8, the radially staggered columnar pattern of the plurality of heat transfer protrusions 160 includes a plurality of radially extending rows 176 (three shown in FIG. 8) that are radially staggered (vertical on page) relative to one another. Any number of rows necessary to cover the desired percentage of chordal length on each side 132, 134 may be used. A first radial distance R1 between centers of heat transfer protrusions 160 in a same radially extending row 176 may range from 0.9 millimeters to 1.4 millimeters. A second radial distance R2 between centers of axially adjacent heat transfer protrusions 160 in adjacent radially extending rows may range from 0.3 millimeters to 0.9 millimeters. An axial distance AD between adjacent radially extending rows 176 of heat transfer protrusions 160 may range from 0.8 millimeters and 1.3 millimeters. An angular offset distance OF between heat transfer protrusions 160 may range, for example, from 0.9 millimeters to 1.4 millimeters. While a particular radially staggered columnar pattern has been described herein, heat transfer protrusions 160 may be arranged in alternative staggered columnar patterns to achieve the desired heat transfer. In other embodiments, portions of innermost widths W2 of adjacent heat transfer protrusions 160 may intersect or overlap.

In operation, coolant exits from impingement sleeve 154 (FIG. 4) and impacts inner surface 152 of airfoil 130. Where present near leading edge 136, heat transfer protrusions 160 cause turbulence in the coolant flow, increasing its heat transfer capabilities. Heat transfer protrusions 160 may extend to any radial extent and any chordal percentage to provide the desired heat transfer and cooling along leading edge 136 and in areas of pressure side 134 and suction side 132 proximate to leading edge 136.

Embodiments of the disclosure provide a cast turbine nozzle, a turbine nozzle section and a turbine. The teachings are especially applicable to certain second stage nozzles having smaller radius leading edges. The heat transfer protrusions provide improved cooling effectiveness to maintain part life, turbine efficiency, and power output for product specifications. More particularly, the heat transfer protrusions or "bumps" increase surface area internal to the airfoil and provide additional heat transfer effectiveness by disturbing airflow, increasing the exchange of energy (heat transfer), relative to a flat, non-enhanced surface. Because heat transfer protrusions are applied only to a portion of airfoil body, the arrangement prevents overheating downstream from the leading edge for narrower airfoils.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" as applied to a particular value of a range applies to both end values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A cast turbine nozzle, comprising:
an airfoil having a body including a suction side, a pressure side opposing the suction side, a leading edge spanning between the pressure side and the suction side, a trailing edge opposing the leading edge and spanning between the pressure side and the suction side, and a cooling cavity defined by an inner surface of the body;

at least one endwall connected with the airfoil along the suction side, the pressure side, the trailing edge and the leading edge; and a plurality of heat transfer protrusions extending inwardly from the inner surface of the body within the cooling cavity, the plurality of heat transfer protrusions extending from the leading edge along the suction side and along the pressure side in a radially staggered columnar pattern, wherein the inner surface includes a planar surface extending between adjacent heat transfer protrusions, wherein a portion of the inner surface downstream of the plurality of heat transfer protrusions is devoid of the plurality of heat transfer protrusions or other structures that cause turbulence, in an aft direction toward the trailing edge.

2. The cast turbine nozzle of claim 1, wherein the turbine nozzle includes a second stage nozzle.

3. The cast turbine nozzle of claim 1, wherein each heat transfer protrusion of the plurality of heat transfer protrusions has a frustoconical cross-section through a height thereof.

4. The cast turbine nozzle of claim 3, wherein each heat transfer protrusion of the plurality of heat transfer protrusions has an innermost surface that is parallel with the inner surface of the cooling cavity between adjacent heat transfer protrusions.

5. The cast turbine nozzle of claim 3, wherein each heat transfer protrusion has a circular cross-section through a width thereof.

6. The cast turbine nozzle of claim 1, further comprising an impingement sleeve within the cooling cavity, the impingement sleeve including a plurality of holes therein configured to direct a coolant against the inner surface and about the plurality of heat transfer protrusions.

7. The cast turbine nozzle of claim 1, wherein the at least one endwall includes an inner endwall or an outer endwall.

8. The cast turbine nozzle of claim 1, wherein a ratio of an innermost width of each heat transfer protrusion to an outermost width of each heat transfer protrusion relative to the inner surface is in a range from 0.2 to 0.9.

9. The cast turbine nozzle of claim 8, wherein the innermost width of each heat transfer protrusion ranges from 0.2 millimeters to 0.8 millimeters.

10. The cast turbine nozzle of claim 1, wherein a height of each heat transfer protrusion from the inner surface ranges from 0.5 millimeters to 1.0 millimeters.

11. The cast turbine nozzle of claim 1, wherein the radially staggered columnar pattern of the plurality of heat transfer protrusions includes a plurality of radially extending rows that are radially staggered relative to one another, wherein a first radial distance between centers of heat transfer protrusions in a same radially extending row ranges from 0.9 millimeters to 1.4 millimeters, and a second radial distance between centers of axially adjacent heat transfer protrusions in adjacent radially extending rows ranges from 0.3 millimeters to 0.9 millimeters, and wherein an axial distance between adjacent radially extending rows of the heat transfer protrusions ranges from 0.8 millimeters and 1.3 millimeters.

12. The cast turbine nozzle of claim 1, wherein the plurality of heat transfer protrusions extends in a range of 28% to 32% of a camber length along suction side, and a range of 9% to 13% of the camber length along pressure side.

13. A nozzle section for a turbine, the nozzle section comprising:

a set of nozzles, the set of nozzles including at least one cast nozzle having:

an airfoil having a body including a suction side, a pressure side opposing the suction side, a leading edge spanning between the pressure side and the suction side, a trailing edge opposing the leading edge and spanning between the pressure side and the suction side, and a cooling cavity having an inner surface defined within the body;

at least one endwall connected with the airfoil along the suction side, the pressure side, the trailing edge and the leading edge; and a plurality of heat transfer protrusions extending inwardly from the inner surface within the body, the plurality of heat transfer protrusions extending from the leading edge along the suction side and along the pressure side in a radially staggered columnar pattern, wherein the inner surface includes a planar surface extending between adjacent heat transfer protrusions, wherein a portion of the inner surface downstream of the plurality of heat transfer protrusions is devoid of the plurality of heat transfer protrusions or other structures that cause turbulence, in an aft direction toward the trailing edge.

14. The nozzle section of claim 13, wherein the static nozzle section is a second stage nozzle section.

15. The nozzle section of claim 13, wherein each heat transfer protrusion of the plurality of heat transfer protrusions has a frustoconical cross-section through a height thereof.

16. The nozzle section of claim 13, wherein a ratio of an innermost width of each heat transfer protrusion to an outermost width of each heat transfer protrusion relative to the inner surface is in a range from 0.2 to 0.9, and the innermost width of each heat transfer protrusion ranges from 0.2 millimeters to 0.8 millimeters.

17. The nozzle section of claim 16, wherein the outermost width of each heat transfer protrusion of the plurality of heat transfer protrusions ranges from 0.6 millimeters to 1.2 millimeters.

18. The nozzle section of claim 13, wherein the radially staggered columnar pattern of the plurality of heat transfer protrusions includes a plurality of radially extending rows that are radially staggered relative to one another, wherein a first radial distance between centers of the heat transfer protrusions in a same radially extending row ranges from 0.9 millimeters to 1.4 millimeters, and a second radial distance between centers of axially adjacent heat transfer protrusions in adjacent radially extending rows ranges from 0.3 millimeters to 0.9 millimeters, and wherein an axial distance between adjacent radially extending rows of the heat transfer protrusions ranges from 0.8 millimeters and 1.3 millimeters.

19. The nozzle section of claim 13, wherein the plurality of heat transfer protrusions extends in a range of 28% to 32% of a camber length along suction side, and a range of 9% to 13% of the camber length along pressure side.

20. A turbine comprising a plurality of cast turbine nozzles, each of the cast turbine nozzles comprising:

an airfoil having a body including a suction side, a pressure side opposing the suction side, a leading edge spanning between the pressure side and the suction side, a trailing edge opposing the leading edge and spanning between the pressure side and the suction side, and a cooling cavity having an inner surface defined within the body;

at least one endwall connected with the airfoil along the suction side, the pressure side, the trailing edge and the leading edge; and a plurality of heat transfer protrusions extending inwardly from the inner surface within the body, the plurality of heat transfer protrusions extending from the leading edge along the suction side and along the pressure side in a radially staggered columnar pattern, wherein the inner surface includes a planar surface extending between adjacent heat transfer protrusions, wherein a portion of the inner surface downstream of the plurality of heat transfer protrusions is devoid of the plurality of heat transfer protrusions or other structures that cause turbulence, in an aft direction toward the trailing edge.

* * * * *